(12) United States Patent
Varble et al.

(10) Patent No.: US 7,218,723 B2
(45) Date of Patent: May 15, 2007

(54) NEXT-GENERATION NETWORK THAT REDUCES THE EFFECT OF A SERVICE FAILURE

(75) Inventors: T. Bryan Varble, Ft. Lauderdale, FL (US); Robert A. Bivin, Windsor, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 749 days.

(21) Appl. No.: 10/684,744

(22) Filed: Oct. 14, 2003

(65) Prior Publication Data

US 2006/0072732 A1 Apr. 6, 2006

(51) Int. Cl.
*H04M 7/00* (2006.01)
*H04L 12/66* (2006.01)

(52) U.S. Cl. .................. 379/221.03; 379/219; 370/352

(58) Field of Classification Search ................ 379/219, 379/220.01, 221.01–221.04, 229, 230, 207.02, 379/32.01, 33, 37, 45; 370/351–356
See application file for complete search history.

(56) References Cited

U.S. PATENT DOCUMENTS

| | | | |
|---|---|---|---|
| 6,400,813 B1 | 6/2002 | Birnhak | 379/133 |
| 6,404,782 B1 | 6/2002 | Berenbaum et al. | 370/522 |
| 6,427,001 B1 | 7/2002 | Contractor et al. | 379/45 |
| 6,434,223 B2 | 8/2002 | Katz | 379/93.13 |
| 6,480,597 B1 | 11/2002 | Kult et al. | 379/242 |
| 6,501,831 B2 | 12/2002 | Savaglio et al. | 379/45 |
| 6,519,336 B1 | 2/2003 | Vanden Heuvel et al. | 379/219 |
| 7,120,139 B1 * | 10/2006 | Kung et al. | 370/352 |
| 2004/0042485 A1 * | 3/2004 | Gettala et al. | 370/465 |
| 2006/0031535 A1 * | 2/2006 | Hackl et al. | 709/228 |

OTHER PUBLICATIONS

Draft Revised "H.248 Sub-series Implementors' Guide for Approval", Telecommunication Standardization Sector, Study Group 16, TD 36 (PLEN) Rev. 1, 2003, pp. 1-34.
Recommendation H.248(V2)* for Consent, ITU-Telecommunication Standardization Sector, Study Group 16, TD 31r1 (PLEN), 2002, pp. 1-143.
H.248 Information Site, [online], [Retrieved on Oct. 17, 2003]. Retrieved from the Internet:<URL:http://www.packetizer.com/iptel/h248/>, pp. 1-3.
Product Announcements, [online], [Retrieved on Oct. 17, 2003]. Retrieved from the Internet: <URL:http://www.nortelnetworks.com/products/announcements/eol2002c/dms_ser1_per.html>. pp. 1-5.
DMS-10 Feature Planning Guide, [online], [Retrieved on Oct. 27, 2003]. Retrieved from the Internet: <URL:http://www.nortelnetworks.com/products/01/dms-10/fpg/remote_access.html>. pp. 1-13.

(Continued)

*Primary Examiner*—Benny Quoc Tieu
(74) *Attorney, Agent, or Firm*—Mark C. Pickering (57) ABSTRACT

A next-generation network utilizes a three-tier, cascading fault approach to providing emergency stand-alone (ESA) switching in a circuit-to-packet (C2P) network. Calls that are placed to destination numbers which are connected to the same local network device are completed even when connectivity with a community network level has been interrupted, while calls that are placed to destination numbers which are connected to the same community are completed even when connectivity with a gateway media controller has been interrupted.

16 Claims, 6 Drawing Sheets

OTHER PUBLICATIONS

Succession Media Gateway 9000, [online], [Retrieved on Oct. 27, 2003]. Retrieved from the Internet: <URL:http://www.nortelnetworks.com/products/01/succession/cs/ue9000.html>. pp. 1-2.

Succession Media Gateway 9000, [online], [Retrieved on Oct. 27, 2003]. Retrieved from the Internet: <URL:http://www.nortelnetworks.com/products/01/succession/cs/ue9000_fandb.html>. pp. 1-3.

R. Kunkel, "Enhanced Network Evolution For Independent Operating Carriers", Rev. 1,8, 2002, [online], [Retrieved on Nov. 14, 2002], Retrieved from the Internet: <URL:http://www.nortelnetworks.com/corporate/events/2002d/ruralmarket customers_eseminar/collateral/rural_dms-10-100_webcast.pdf>. pp. 1-32 (unnumbered).

* cited by examiner

NEXT-GENERATION NETWORK THAT REDUCES THE EFFECT OF A SERVICE FAILURE

BACKGROUND OF THE INVENTION

1. Field of the Invention

The present invention relates to networks and, more particularly, to a next-generation network that reduces the effect of a service failure.

2. Description of the Related Art

Data traffic is commonly carried over a packet-switched network such as the internet. Voice traffic, on the other hand, is commonly carried over the public switched telephone network (PSTN). Voice traffic can also be broken up into packets and sent over packet-switched networks as voice-over-IP (VoIP).

With a packet-switched network, data and voice signals are broken up into a number of packets which are sent from one end to the other end by the most efficient route. This often results in packets of the same data message or telephone call being sent from one end to the other end by different routes. This differs from telephone calls sent over the PSTN where an end-to-end circuit is formed for each telephone call.

Figure 1:
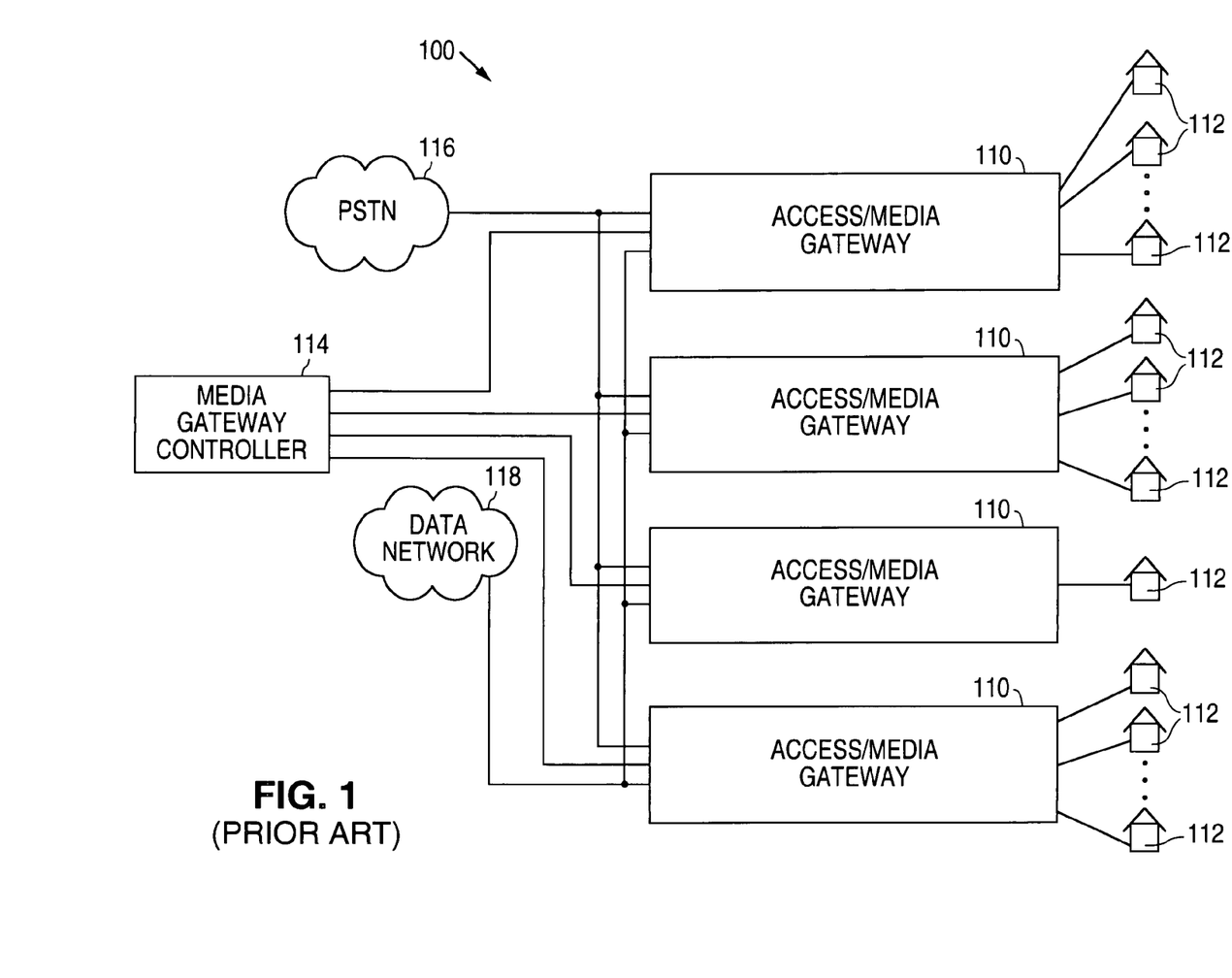
FIG. 1 is a diagram illustrating a prior-art, next-generation network 100.

As equipment ages and is replaced by newer equipment, many carriers are migrating towards a next-generation network. FIG. 1 shows a diagram that illustrates a prior-art, next-generation network 100. As shown in FIG. 1, network 100 utilizes a number of access/media gateways 110 that are each connected to a number of customer premises 112, and a media gateway controller 114 that is connected to each access/media gateway 110.

As further shown in FIG. 1, each access/media gateway 110 is also connected to both a PSTN 116 and a data network 118, such as the internet. Access/media gateways 110 are commonly located in telephone company offices, and are connected to, for example, xDSL modems, at the customer premises 112.

Access/media gateways 110 can include, for example, DSL access multiplexers (DSLAMs) that separate voice and data signals from a customer, forward the voice signals onto PSTN 116, and forward data signals onto network 118. The call and service control logic, however, do not reside in the access/media gateways 110, but instead reside in media gateway controller 114.

One advantage of next-generation network 100 is that by placing the call control functions in media gateway controller 114, the call control functions can be concentrated in fewer locations for significant cost reductions. However, one drawback of next-generation network 100 is that when media gateway controller 114 fails or service is otherwise interrupted, significant numbers of customers are left without service for the duration of the interruption.

One solution to a failed media gateway controller 114 is to use a number of media gateway controllers 114 where the media gateway controllers 114 are used to back up each other. For example, if access/media gateway 110 is unable to contact media gateway controller 114 after a predetermined time, access/media gateway 110 responds by attempting to contact a predetermined backup controller.

In smaller markets, however, the cost of a backup media gateway controller may not be justified by the number of customers that are potentially available. As a result, there is a need for a next-generation network that reduces the effect of a service failure.

SUMMARY OF THE INVENTION

The present invention provides a next-generation network that reduces the effect of a service failure. A network in accordance with the present invention includes a plurality of termination service area (TSA) devices. Each TSA device is connectable to a plurality of customer devices, a public switched telephone network (PTSN), and a data network. A TSA device has a database, a state machine connected to the database, and local calling circuitry connected to the state machine.

When a communications link fails, the state machine establishes an end-to-end voice connection between a first customer device and a second customer device when both the first and the second customer devices are connected to a same TSA device. The state machine also returns an indication that a connection can not be made at this time to a customer device that requested a connection when the first and second customer devices are not connected to the same TSA device.

The present invention also includes a method of operating a network device. The method includes the step of determining a link status. When the link status is negative, the method looks up a dialed number in a device database to determine if the dialed number is in the device database.

When the dialed number is in the device database, the method makes an end-to-end connection between a first user device and a second user device. When the dialed number is not in the device database, the method returns an indication to the first user device that a connection can not be made at this time.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 2:
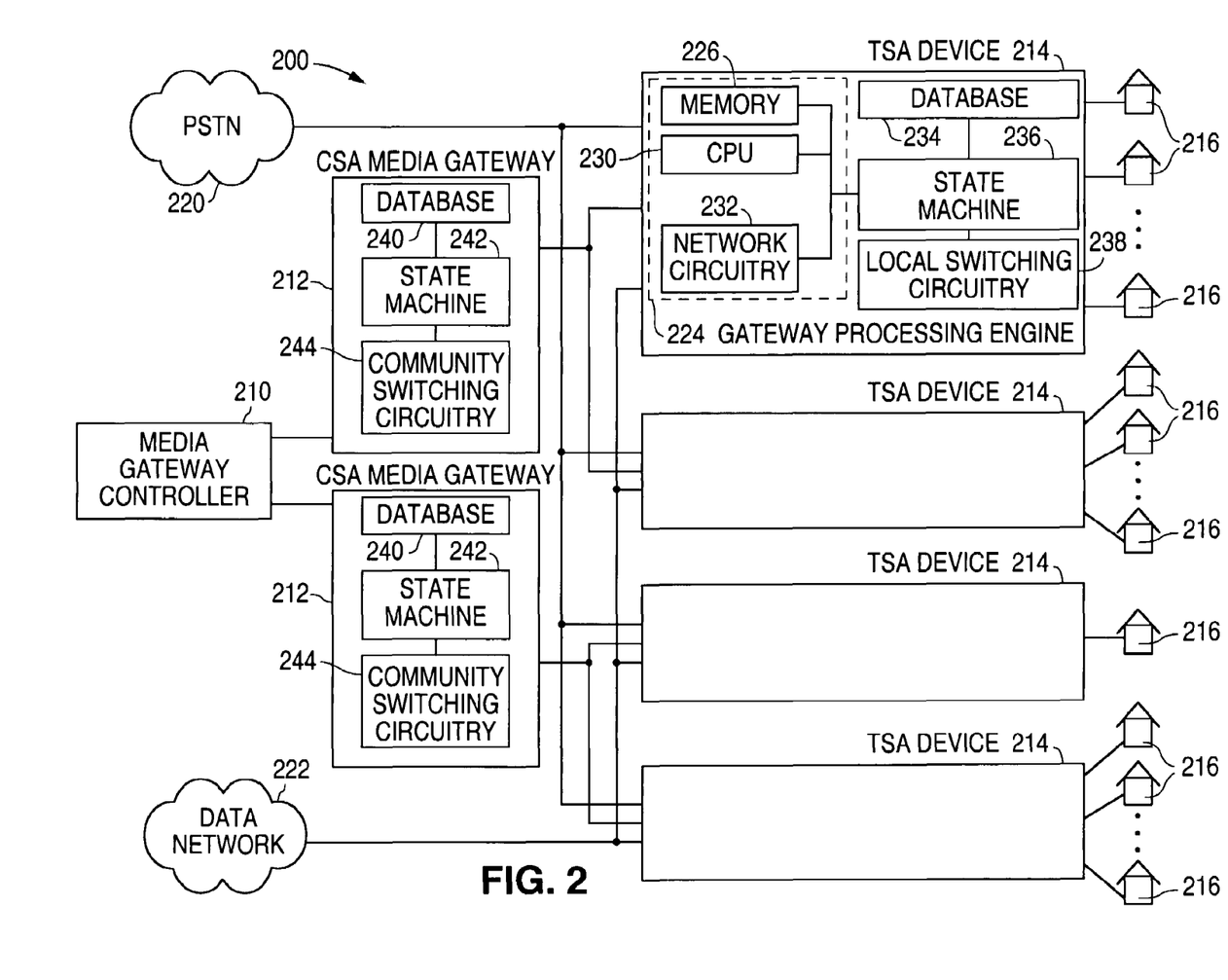
FIG. 2 is a diagram illustrating an example of a next-generation network 200 in accordance with the present invention.

FIG. 2 shows a diagram that illustrates an example of a next-generation network 200 in accordance with the present invention. As shown in FIG. 2, network 200 includes a media gateway controller 210 (which has a network provisioning database), and a number of community service area (CSA) media gateways 212 that are each connected to media gateway controller 210.

As further shown in FIG. 2, network 200 includes a number of termination service area (TSA) devices 214 that have a number of groups of TSA devices that are each connected to a CSA media gateway 212. Each TSA device 214 is connected to a number of customer devices, such as xDSL modems, at a number of customer premises 216, the public switched telephone network (PTSN) 220, and a data network 222.

In addition, each TSA device 214 has a gateway processing engine (GPE) 224 that executes software that implements a portion of a method of the present invention. GPE 224 includes a memory 226 that stores the software and data. The software includes an operating system and a set of program instructions. The operating system can be implemented with, for example, the Linux operating system, although other operating systems can alternately be used. The program instructions can be written in, for example, C++ although other languages can alternately be used.

GPE 224 also includes a central processing unit (CPU) 230 that is connected to memory 226. CPU 230, which can be implemented with, for example, a 32-bit processor, operates on the data in response to the program instructions. Although only one processor is described, the present invention can be implemented with multiple processors in parallel to increase the capacity to process large amounts of data. GPE 224 additionally includes network circuitry 232 that is connected to CPU 230 that allows memory 226 and CPU 230 to be externally loaded and configured.

Further, each TSA device 214 has a database 234 that lists each dialed number (DN) that is connected to the TSA device 214, and a state machine 236 that is connected to CPU 230 and database 234. State machine 236 executes a portion of a method of the present invention.

In addition, each TSA device 214 has local switching circuitry 238 that is connected to state machine 236 that allows connections between local subscribers (connected to the same TSA device) to be made. Each TSA device 214 is responsible for all call control signaling, such as tone generation, tone and loop signal termination, and conversion to, for example, H.248 signaling (an ITU standard) or Megaco signaling (an IETF standard). (H.323, MGCP, SIP, SIP+T and other signaling can also be used.) Each TSA device 214 supplies dial tone and digit collection, as well as normal ringing and call control. Further, each TSA device 214 also serves as the voice packetization gateway.

Similarly, each CSA media gateway 212 has a database 240 that lists each TSA device 214 that is connected to the CSA media gateway 212, and each DN that is connected to each TSA device 214. Each CSA media gateway 212 also has a state machine 242 that executes a method of the present invention.

In addition, each CSA media gateway 212 has community switching circuitry 244 that is connected to state machine 242 that allows connections between community subscribers (connected to the same CSA media gateway) to be made. Each CSA media gateway 212 is responsible for packetized bearer-path switching of CSA media gateway call traffic.

However, as an aggregation switching node, the call control is significantly more complex. To function transparently with the media gateway controller and the TSA devices, the CSA media gateway acts as an H.248 signaling router within the network. That is, under normal operations, the CSA media gateway maintains a control link with the media gateway controller. The CSA media gateway then forwards media gateway controller signaling onto the TSA devices via another control link. In this way, if the media gateway controller to CSA media gateway link fails, the TSA devices never see the "link failure" condition.

Figure 3:
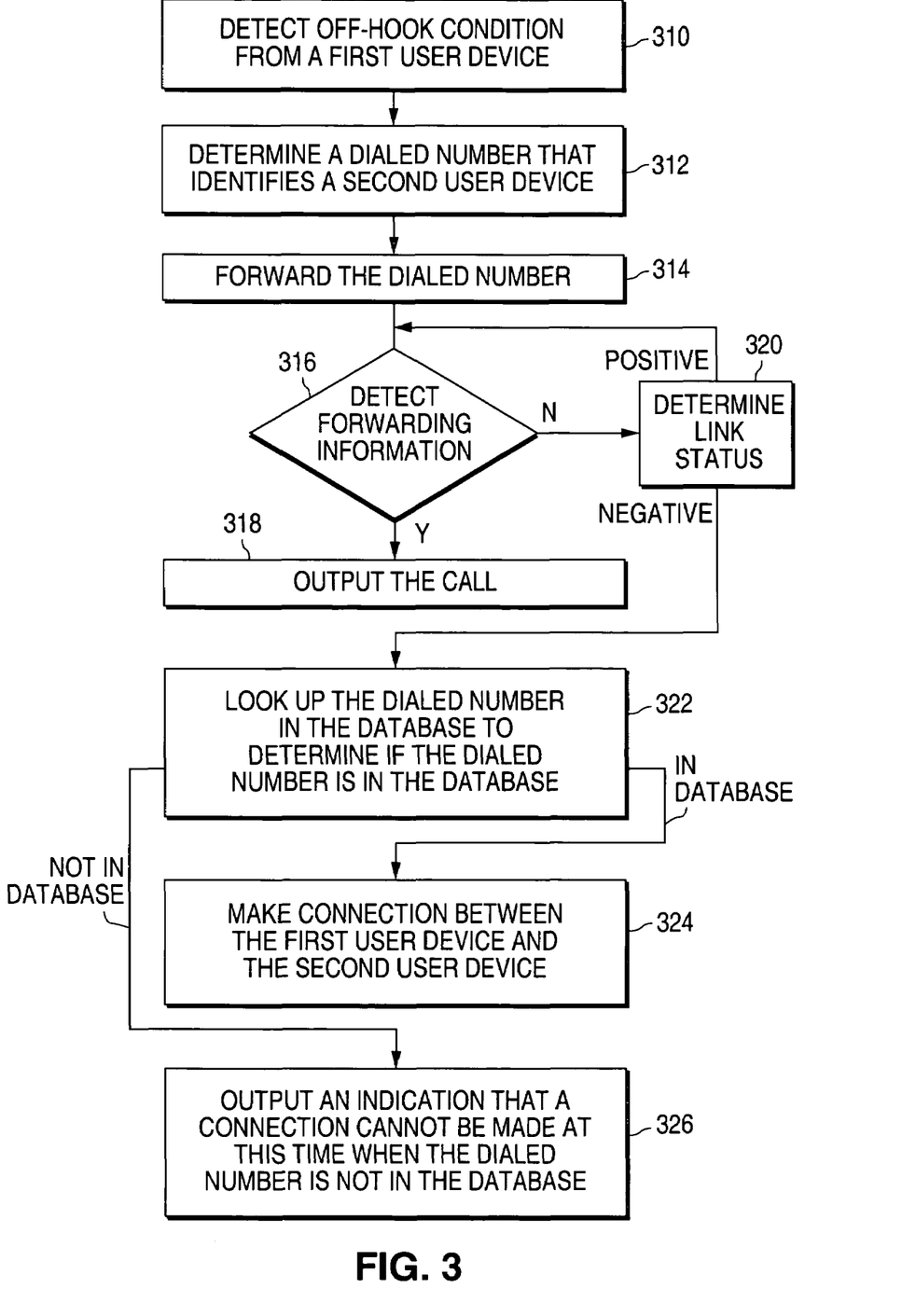
FIG. 3 is a flow chart illustrating an example of a method of operating a TSA device in accordance with the present invention.

FIG. 3 shows a flow chart that illustrates an example of a method of operating a TSA device in accordance with the present invention. As shown in FIG. 3, the method begins at step 310 by detecting an off-hook condition from a first user device. For example, when a user wishes to make a telephone call, the user places the telephone (the first user device) in an off-hook state by picking up the telephone.

When the TSA device detects an off-hook condition, the method moves to step 312 where the TSA device determines a dialed number that identifies a second user device. For example, after the user picks up the telephone, the user dials a sequence of numbers that identifies the telephone of another user.

Once the dialed number has been determined, the method moves to step 314 where the TSA device forwards the dialed number to a CSA media gateway which, in turn, forwards the dialed number to the media gateway controller. The media gateway controller determines how the call initiated by the customer is to be handled, e.g., switched into the PSTN or packetized and routed.

Once the media gateway controller determines the forwarding information for the dialed number, the media gateway controller sends the forwarding information to the CSA media gateway which, in turn, sends the forwarding information to the TSA device that originally collected the dialed number.

During this time, the method moves to step 316 to determine if the forwarding information for the dialed number has been received. When the forwarding information has been received, the method moves to step 318 to output the call by either switching the call onto the PSTN or packetizing and routing the call over a data network.

When the forwarding information has not yet been received, the method moves from step 316 to step 320 to determine a link status. In step 320, the link status identifies the status of the connection with the CSA media gateway and can be determined by, for example, checking a register that is set when the CSA media gateway has not been heard from for a predetermined time out period.

When the link status indication is positive, the method returns to step 316 to determine if the forwarding information for the dialed number has been received. Thus, the method continues to loop until the forwarding information has been received, or the link status indicates that the connection with the CSA media gateway is negative.

When the link status indication is negative, the method moves to step 322 where the state machine of the TSA device looks up the dialed number in the device database to determine if the dialed number is in the device database. When the dialed number is in the device database, the second user device (the telephone of the called user) is a local subscriber that is also connected to the same TSA device. When the dialed number is not in the device database, the second user device is not a local subscriber (is connected to a different TSA device).

When the dialed number is in the device database, the method moves to step 324 where the local switching circuitry of the TSA device makes an end-to-end connection between the first user device and the second user device. 911 calls are routed to a predefined set of numbers (e.g., local fire stations, hospitals) that are connected to the same TSA device as the originating caller. (The predefined numbers can be utilized in a virtual hunt group that provides connections in a hunt group order.)

On the other hand, when the dialed number is not in the device database, the method moves from step 322 to step 326 where the TSA device returns an indication to the first user device that a connection can not be made at this time. In the present example, steps 322–326 can be implemented by a call-control state machine that only takes effect when the link status indication in step 320 is negative.

In the present example, advanced services such as Caller ID and *69 are not available when the link status is negative. Thus, from a subscriber's perspective, the telephone functions normally as long as the "called party" is also a local subscriber. Any other destination number results in, for example, a "fast busy" out-of-service indication.

Figure 4:
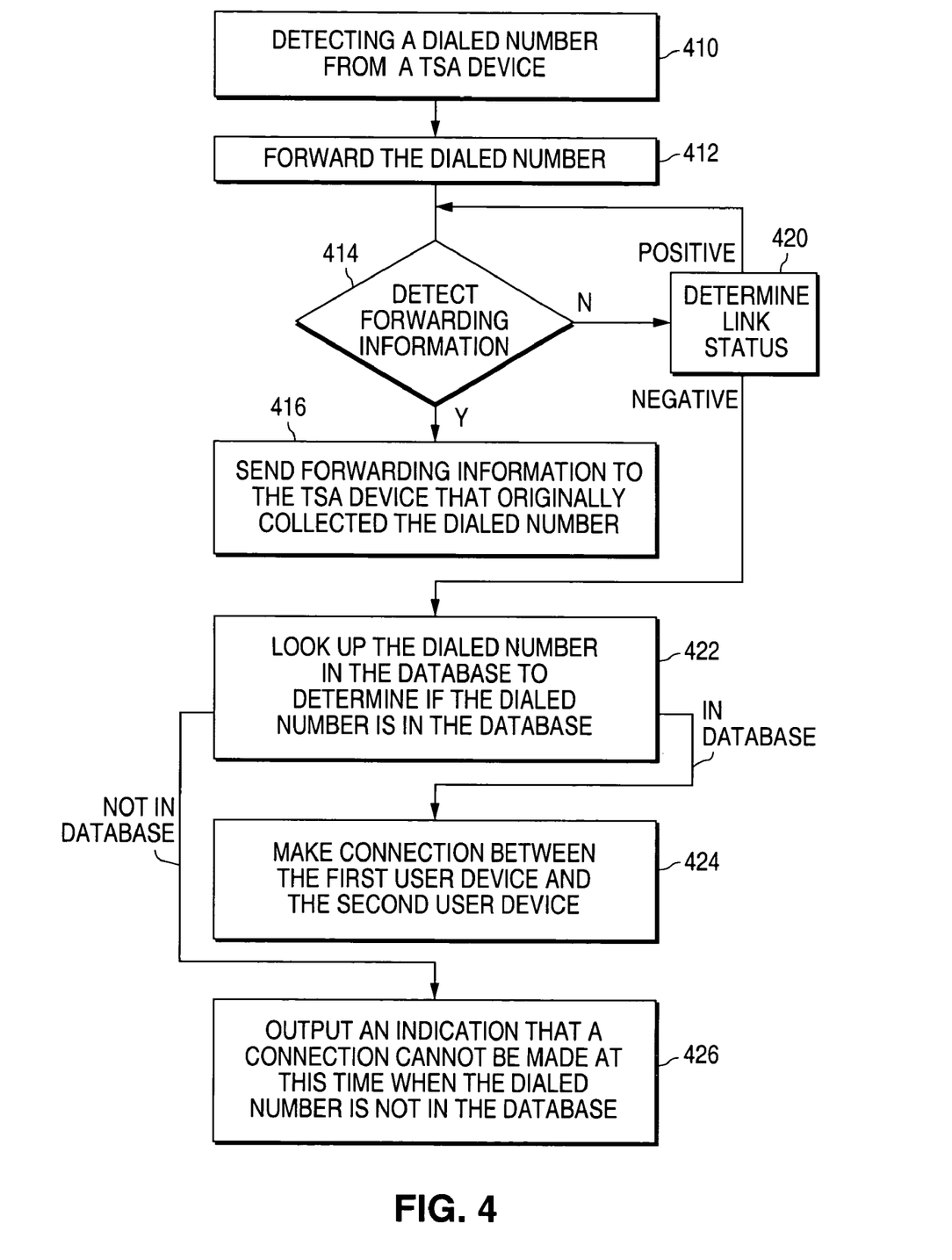
FIG. 4 is a flow chart illustrating an example of a method of operating a community service area (CSA) media gateway in accordance with the present invention.

FIG. 4 shows a flow chart that illustrates an example of a method of operating a CSA media gateway in accordance with the present invention. As shown in FIG. 4, the method begins at step 410 by detecting a dialed number from a requesting TSA device. When a dialed number is detected, the method moves to step 412 to forward the dialed number to a media gateway controller.

As above, the media gateway controller determines how the call initiated by the user is to be handled, e.g., switched into the PSTN or packetized and routed. Once the media gateway controller determines the forwarding information for the dialed number, the media gateway controller sends the forwarding information to the CSA media gateway.

During this time, the method moves to step 414 to determine if the forwarding information for the dialed number has been received. When the forwarding information has been received, the method moves to step 416 to send the forwarding information to the TSA device that originally collected the dialed number.

When the forwarding information has not yet been received, the method moves from step 414 to step 420 to determine a link status. In step 420, the link status identifies the status of the connection with the media gateway controller and can be determined by checking a register that is set when the media gateway controller has not been heard from for a predefined time out period.

When the link status indication is positive, the method returns to step 414 to determine if the forwarding information for the dialed number has been received. Thus, the method continues to loop until the forwarding information has been received, or the link status indicates that the connection with the media gateway controller is negative.

When the link status indication is negative, the method moves to step 422 where the state machine of the CSA device looks up the dialed number in the CSA database to determine if the dialed number is in the CSA database. When the dialed number is in the CSA database, the second user device (the telephone of the called user) is a community subscriber that is also connected to the same CSA media gateway. When the dialed number is not in the CSA database, the second user device is not a community subscriber (is connected to a different CSA media gateway).

When the dialed number is in the CSA database, the method moves to step 424 where the community switching circuitry of the CSA media gateway makes an end-to-end connection between the first user device and the second user device. 911 calls are routed to a predefined community terminations, whether local numbers (e.g., local fire stations, hospitals) or 911 tandem trunks.

On the other hand, when the dialed number is not in the CSA database, the method moves to step 426 where the CSA media gateway returns an indication that a connection can not be made at this time to the requesting TSA device which, in turn, forwards the indication to the first user device.

Due to its larger geographic footprint, a CSA media gateway in stand-alone mode (when the link status is negative) may retain access to long-distance and 911 outbound trunks. In the present example, the CSA media gateway does not support normal trunking in the stand-alone mode. Instead, "off-CSA" calls receive an out-of-service indication, while 911 calls are routed to the emergency virtual hunt groups.

Figure 5:
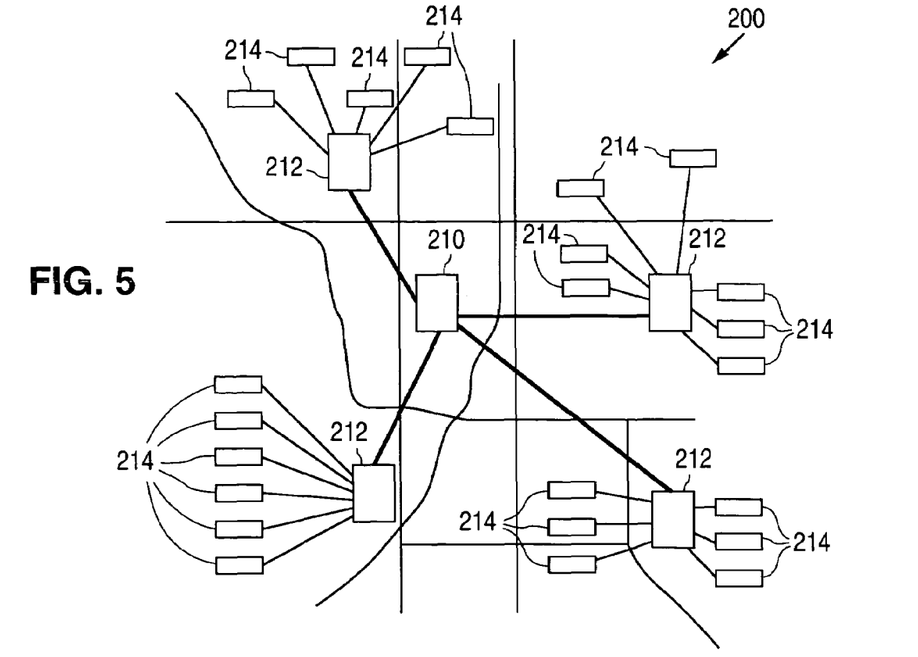
FIG. 5 is a map of a city illustrating network 200 overlaid on the map in accordance with the present invention.

FIG. 5 shows a map of a city that illustrates network 200 overlaid on the map in accordance with the present invention. As shown in FIG. 5, media gateway controller 210, which can be implemented with, for example, a Model No. CS2000 Media Gateway Controller sold by Nortel, is centrally located in the city.

As further shown in FIG. 5, four CSA media gateways 212, which are each connected to media gateway controller 210, are generally located in the four quadrants of the city. The CSA media gateways 212 can be implemented with, for example, TelliantMG CSA switches sold by Advanced Fiber Communications, which have been modified to include the present invention. CSA switches can include any number of total lines, such as 50,000 lines [non-blocking].

The four CSA media gateways 212 are connected to a total of 24 TSA devices 214 which, in turn, provide service to the users of the city. The TSA devices 214, which can be located in the local offices of the telephone company, can be implemented with, for example, an AccessMAX sold by Advanced Fiber Communications, which has been modified to include the present invention.

Figure 6:
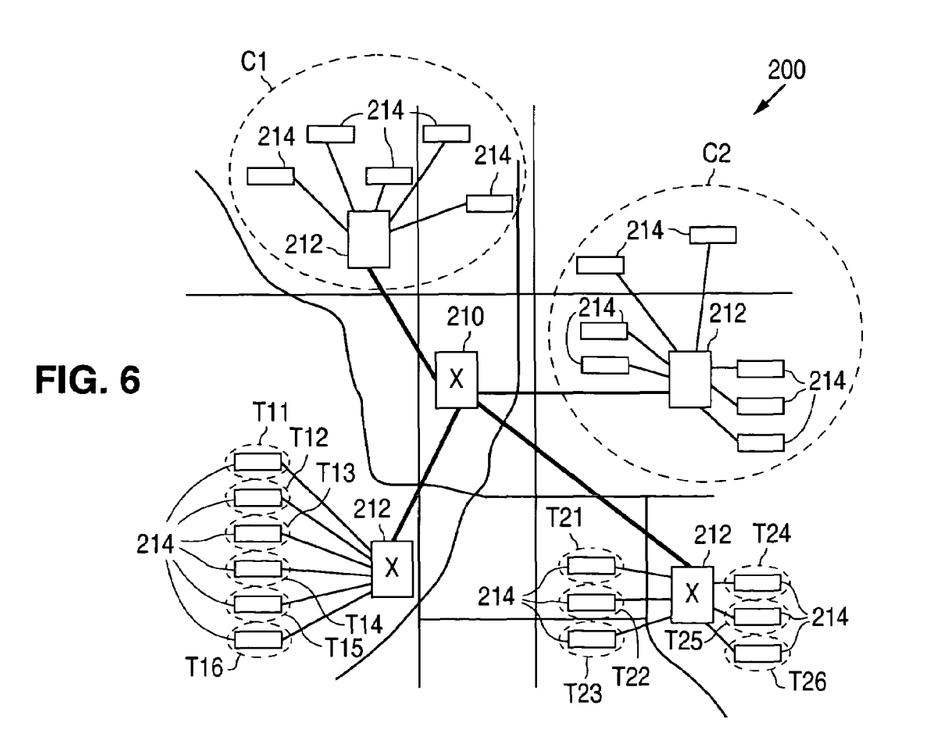
FIG. 6 is a map of the city illustrating network 200 overlaid on the map with a first failure condition in accordance with the present invention.

FIG. 6 shows a map of the city that illustrates network 200 overlaid on the map with a first failure condition in accordance with the present invention. As shown in FIG. 6, media gateway controller 210 and the two southern CSA media gateways 212 have failed or are otherwise unavailable. The resulting service footprints are indicated by the dotted lines C1, C2, T11–16, and T21–T26.

The dotted lines C1 and C2 indicate that calls placed within these community zones continue to be made, while calls placed outside of lines C1 and C2 are temporarily unavailable. The dotted lines T11–T16 and T21–T26 indicate that calls placed within these smaller local zones continue to be made, while calls placed outside of lines T11–T16 and T21–T26 are temporarily unavailable, e.g., calls placed within lines T11 continue to be made, while calls placed outside of lines T11 are temporarily unavailable. In this example, two different service tiers are operating simultaneously based on the CSA media gateway availability.

Figure 7:
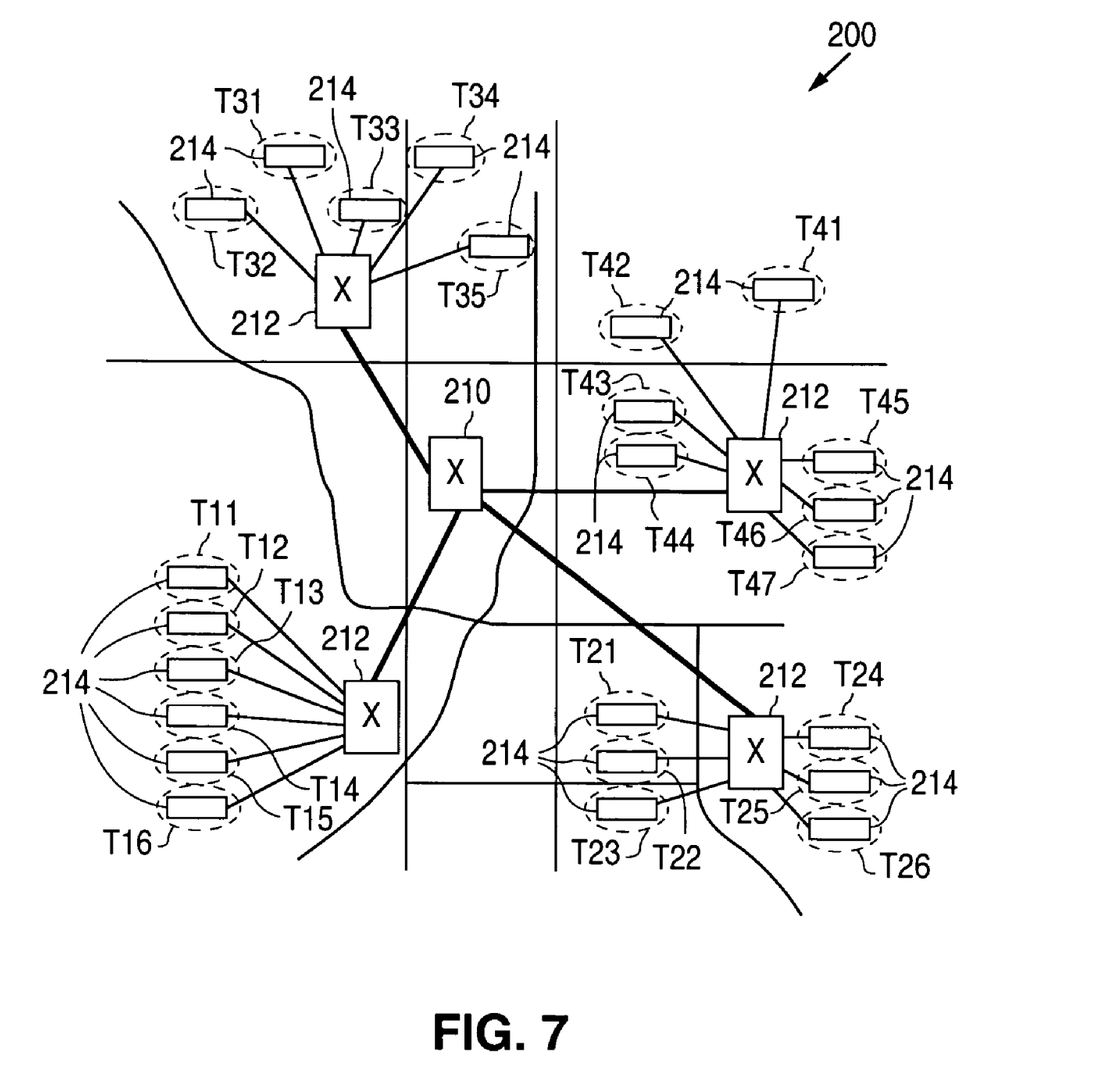
FIG. 7 is a map of the city illustrating network 200 overlaid on the map with a second failure condition in accordance with the present invention.

FIG. 7 shows a map of the city that illustrates network 200 overlaid on the map with a second failure condition in accordance with the present invention. As shown in FIG. 7, media gateway controller 210 and all four of the CSA media gateways 212 have failed or are otherwise unavailable. The resulting service footprints are indicated by the dotted lines T11–16, T21–T26, T31–T35, and T41–47. Despite this complete outage, all of the TSA devices continue to supply emergency 911 and TSA-level calling.

Thus, the present invention provides emergency stand-alone (ESA) switching in a circuit-to-packet (C2P) network. The network of the present invention utilizes a three-tier, cascading fault approach with contracting service plateaus at each level, i.e., the community level and the local level.

One of the advantages of the present invention is that the present invention changes the next-generation network topology from a flat, one-deep star to a hierarchical, three-deep tree. This allows carriers the ability to retain much of the resilience of the legacy class 5 network (where switching determinations are made at the edge of the network), while still deploying distributed next-generation services and equipment.

Another advantage is that the present invention allows arbitrary-sized community groupings of subscribers, thereby removing the material line limits. In addition, the present invention distributes call control logic within a carrier's network which, in turn, provides a level of network resiliency (all tone and loop signal termination and conversion to H.248 MeGaCo signaling are performed by a TSA device 214, while packetized bearer-path switching and H.248 signal routing are performed by a CSA media gateway.

As a result, the present invention scales upwards based on network performance and business needs and is not limited by specific line sizes. Further, the geographical isolation hierarchy allows carriers to supply stable, controlled, service degradation in the event that a media gateway controller fails or is otherwise unavailable.

It should be understood that the above descriptions are examples of the present invention, and that various alternatives of the invention described herein may be employed in practicing the invention. For example, TSA devices can be directly connected to a media gateway controller. Thus, it is intended that the following claims define the scope of the invention and that structures and methods within the scope of these claims and their equivalents be covered thereby.

What is claimed is:

1. A network comprising a plurality of termination service area (TSA) devices, each TSA device being connectable to a plurality of customer devices, a public switched-telephone network (PTSN), and a data network, a TSA device having a database, a state machine connected to the database, and local calling circuitry connected to the state machine, when a communications link fails, the state machine:
    establishes an end-to-end voice connection between a first customer device and a second customer device when both the first and the second customer devices are connected to a same TSA device; and
    returns an indication that a connection can not be made at this time to a customer device that requested a connection when the first and second customer devices are not connected to the same TSA device.

2. The network of claim 1 wherein the TSA device determines a link status, and
    when the link status is negative, the state machine looks up a dialed number in a device database to determine if the dialed number is in the database;
    when the dialed number is in the device database, the state machine directs the local calling circuitry to make the end-to-end connection between the first user device and the second user device; and
    when the dialed number is not in the device database, returning the indication to the first user device that a connection can not be made at this time.

3. The network of claim 2 wherein when the link status is positive, the TSA device determines whether forwarding information has been received from a media gateway controller.

4. The network of claim 3 wherein the TSA device:
    detects an off-hook condition from the first user device;
    when the off-hook condition is detected, determines a dialed number that identifies the second user device; and
    when the dialed number has been determined, forwards the dialed number to the media gateway controller.

5. The network of claim 4 wherein the TSA device:
    determines if forwarding information for the dialed number has been received;
    when forwarding information has been received, outputs a call by either switching the call onto the PSTN or packetizing and routing the call over a data network; and
    when the forwarding information has not yet been received, determining the link status.

6. The network of claim 1 and further comprising a plurality of community service area (CSA) media gateways, each CSA media gateway being connected to a number of TSA devices, a CSA media gateway having a CSA database, a CSA state machine connected to the CSA database, and community calling circuitry connected to the CSA state machine.

7. The network of claim 6 wherein when a communications link fails, the CSA state machine:
    establishes an end-to-end voice connection between the first customer device and the second customer device when the first customer device is connected to the CSA media gateway via a first TSA device, and the second customer is connected to the CSA media gateway via the first TSA device or a second TSA device; and
    returns an indication that a connection can not be made at this time to a customer device that requested a connection when the first and second customer devices are not connected to TSA devices that are connected to a same CSA media gateway.

8. The network of claim 7 and further comprising a media gateway controller connected to a number of CSA media gateways, the media gateway controller controlling connections between a large number of customer devices, including the first customer device and the second customer device.

9. A method of operating a network device, the method comprising the steps of:
    determining a link status;
    when the link status is negative, looking up a dialed number in a device database to determine if the dialed number is in the device database;
    when the dialed number is in the device database, making an end-to-end connection between a first user device and a second user device; and
    when the dialed number is not in the device database, returning an indication to the first user device that a connection can not be made at this time.

10. The method of claim 9 wherein:
    a local device is connected to a plurality of customers with a plurality of telephone numbers; and
    911 calls are routed to a predefined set of telephone numbers that are connected to a same local device as an originating caller.

11. The method of claim 9 wherein when the link status is positive, determining whether forwarding information has been received from a media gateway controller.

12. The method of claim 9 and further comprising the steps of:
    detecting an off-hook condition from the first user device;
    when an off-hook condition is detected, determining a dialed number that identifies a second user device; and
    when the dialed number has been determined, forwarding the dialed number to the media gateway controller.

13. The method of claim 12 and further comprising the step of determining if forwarding information for the dialed number has been received.

14. The method of claim 13 wherein:
    when forwarding information has been received, outputting a call by either switching the call onto the PSTN or packetizing and routing the call over a data network; and when the forwarding information has not yet been received, determining the link status.

15. The method of claim 9 wherein the network device is connected to a plurality of customer devices and a concentrating network device that is connected to a plurality of network devices.

16. The method of claim 9 wherein the network device is connected to a media gateway controller and a plurality of local devices that are connected to a plurality of customer devices.

* * * * *